(12) United States Patent
Eichberger et al.

(10) Patent No.: US 6,251,162 B1
(45) Date of Patent: Jun. 26, 2001

(54) PROCESS FOR THE PRODUCTION OF LIQUID PIG IRON OR LIQUID INTERMEDIATE PRODUCTS OF STEEL

(75) Inventors: Ernst Eichberger, Pichl/Wels; Günter Schrey, Linz, both of (AT); Franz Reufer, Düsseldorf (DE); Jörg Diehl, Linz; Gerald Rosenfellner, St.Peter/Au, both of (AT)

(73) Assignee: Deutsche Voest-Alpine Industrieanlagenbau GmbH, Dusseldorf (DE)

( * ) Notice: Subject to any disclaimer, the term of this patent is extended or adjusted under 35 U.S.C. 154(b) by 0 days.

(21) Appl. No.: 09/125,869
(22) PCT Filed: Mar. 3, 1997
(86) PCT No.: PCT/AT97/00045
§ 371 Date: Oct. 26, 1998
§ 102(e) Date: Oct. 26, 1998
(87) PCT Pub. No.: WO97/33006
PCT Pub. Date: Sep. 12, 1997

(30) Foreign Application Priority Data

Mar. 5, 1996 (AT) ........................................ 416/96

(51) Int. Cl.⁷ .................................................. C21B 11/00
(52) U.S. Cl. ................................ 75/492; 75/500; 266/156
(58) Field of Search ........................... 75/446, 492, 500; 266/156

(56) References Cited

U.S. PATENT DOCUMENTS

| | | |
|---|---|---|
| 1,742,750 | 1/1930 | Bradley . |
| 5,238,487 * | 8/1993 | Hauk et al. ............................. 75/492 |
| 5,259,864 * | 11/1993 | Greenwalt ............................... 75/492 |

FOREIGN PATENT DOCUMENTS

| | | |
|---|---|---|
| 381954B | 12/1986 | (AT) . |
| 394201 | 2/1992 | (AT) . |
| 396255 | 7/1993 | (AT) . |
| 2546502 A1 | 4/1977 | (DE) . |
| 4037977 C2 | 9/1992 | (DE) . |
| 0027320 A1 | 4/1981 | (EP) . |
| 0487856 A2 | 6/1992 | (EP) . |
| 0487856 A3 | 6/1992 | (EP) . |

OTHER PUBLICATIONS

Patent Abstracts of Japan, Publication No. 53062718; Publication Date May 6, 1978; Application Date Nov. 18, 1976, Application No. 51138836; Applicant Nippon Steel Corp; Inventor Otsuki Naoki; Int. Cl. C21B 13/02 Title "Manufacture of Reduced Iron" Copyright: ©1978, JPO & Japio; Copyright: © JPO.

* cited by examiner

Primary Examiner—Melvyn Andrews
(74) Attorney, Agent, or Firm—Birch, Stewart, Kolasch & Birch, LLP (57) ABSTRACT

In a method for producing liquid pig iron or liquid steel pre-products from charging substances comprising iron ore, preferably in lumps or pellets, and optionally fluxes. The charging substances are directly reduced to sponge iron in a reduction zone (12) and the sponge iron is melted in a melt-down gasifying zone (8) under the supply of carbon carriers and oxygen-containing gas. CO-and $H_2$-containing gas is introduced into the reduction zone (12) and is reacted there. An export gas is withdrawn and conducted to a consumer (20). The export gas is subjected to $CO_2$ removal or partial combustion and the resulting gas with $CO_2$ is introduced back into the reduction process. This is done to keep down the carbon carriers having high portion of $C_{fix}$ as well as consumption of $O_2$. A highly $CO_2$-containing gas having a $CO_2$ content far in excess of the $CO_2$ content of the export gas, preferably exceeding 40%, and having a CO content that is far below the CO content of the export gas is introduced into the melt-down gasifying zone (8).

15 Claims, 5 Drawing Sheets

PROCESS FOR THE PRODUCTION OF LIQUID PIG IRON OR LIQUID INTERMEDIATE PRODUCTS OF STEEL

This application is the national phase under 35 U.S.C. §371 of prior PCT International Application No. PCT/AT97/00045 which has an International filing date of Mar. 3, 1997 which designated the United States of America, the entire contents of which are hereby incorporated by reference.

The invention relates to a method for producing liquid pig iron or liquid steel pre-products from charging substances comprising iron ore, preferably in lumps and/or pellets, and optionally fluxes, wherein the charging substances are directly reduced to sponge iron in a reduction zone, the sponge iron is melted in a melt-down gasifying zone under the supply of carbon carriers and oxygen-containing gas and a CO— and $H_2$-containing reducing gas is produced which is introduced into the reduction zone, is reacted there and withdrawn as an export gas, and wherein the withdrawn export gas is conducted to a consumer, and a plant for carrying out the method.

A method of this kind is known f.i. from DE-C-40 37 977. In accordance with DE-C-40 37 977 the export gas, which incurs in considerable quantities and still has substantial contents of carbon monoxide and hydrogen, in order to minimize production costs for the sponge iron or for pig iron melted therefrom is supplied to a further reduction zone that acts as a consumer, for the reduction of additional iron-containing material, but after having been subjected to preparation.

With this known method, overheating may result in the melter gasifier if carbon carriers having a high content of $C_{fix}$ are gasified into the melter gasifier. Carbon carriers of this kind are f.i. anthracites and calcinable petroleum coke qualities. A further disadvantage of the known methods is to be seen in that the specific amount of $O_2$ consumed for each unit of reductants that is produced is relatively high, as carbon monoxide formation within the melter gasifier takes place exclusively through oxygen under the gasification of the carbon carriers.

The invention aims at avoiding these disadvantages and difficulties and has as its object to create a method and an arrangement for carrying out the method enabling the use of carbon carriers having a high $C_{fix}$ content. In addition, the specific amount of oxygen consumed in effecting coal gasification is to be reduced.

In accordance with the invention this object is achieved in that a highly $CO_2$-containing gas having a $CO_2$ content far in excess of the $CO_2$ content of the export gas, preferably exceeding 40%, and having a CO content—if there is a CO content—that is far below the CO content of the export gas is introduced into the melt-down gasifying zone and there is reacted with carbon carriers under the formation of CO.

In accordance with AT-B-394.201, which relates to a method of a kind similar to that initially described, the $CO_2$-containing export gas is cooled in a scrubber as well as purified together with a portion of the hot reducing gas having a poorer $CO_2$ content which is formed in the melter gasifier and subjected to a technically demanding desulfurizing operation, and is then utilized as a fuel gas for a gas turbine. With this method, process engineering expenditures for the processing of a fuel gas answering to the requirements of environmental protection are relatively high and moreover necessitate considerable investment.

From AT-B-394.201 it is known to introduce export gas from the reduction stage into the fluidized bed of the melter gasifier as an oxygen carrier under heat consumption. As the $CO_2$ content of the export gas, which is at roughly 25% to 35%, is only slight and the export gas in addition is dust laden, the effect achieved in this manner is slight as well. One disadvantage of this method is that along with the export gas a relatively high portion of carbon monoxide passes into the melter gasifier that must previously be cooled and then has to be re-heated in the melter gasifier. This particular portion of CO thus represents ballast that has to be sluiced through the melter gasifier, incurring all the disadvantages resulting therefrom (pressure loss, unnecessarily high-capacity compressors, increased energy consumption etc.).

One further disadvantage resides in the fact that in accordance with AT-B-394.201 a desulfurization means has to be provided for the reduction excess gas, whereas according to the invention a means of this kind is either not required at all—if the sulfur content of the reducing gas is to be transmitted to the liquid phase—or has to be provided only for the offgas exiting the $CO_2$ removal plant.

The advantages achieved with a method in accordance with the invention are as follows:

By the introduction in accordance with the invention of the gas having a high $CO_2$ content, reaction of the $CO_2$ takes place in accordance with the equation $CO_2+C \rightarrow 2$ CO. Carbon monoxide is formed which increases the reducing gas stream and as a result is available for reduction. Reaction of the carbon dioxide gas under the formation of carbon monoxide takes place endothermally, whereby through a suitably dosed introduction of a gas having a high portion of $CO_2$ the desired temperature will adjust in the melter gasifier and overheating can be completely avoided.

Thus it is feasible in accordance with the invention to utilize carbon carriers having a high portion of $C_{fix}$ and a natural deficiency in volatile components, such as anthracites and calcinable petroleum coke qualities, in quantities which due to the overheating effect would not be permissible without simultaneously utilizing the highly $CO_2$-containing gas exerting a temperature-lowering effect. Moreover, the carbon monoxide forming inside the melter gasifier from the offgas containing a high portion of $CO_2$—per mol $CO_2$ two mol carbon monoxide are formed with one mol carbon—in a useful manner increases the reducing gas stream required for reducing iron oxides.

A further advantage of the method according to the invention lies in the fact that the specific consumption Of $O_2$ per unit of reductants produced decreases, since a portion of the carbon carriers in the melter gasifier is consumed in the formation of carbon monoxide not using oxygen, but using the carbon dioxide. As a result, the amount of energy required in providing the oxygen also decreases considerably. The method according to the invention thus makes it feasible to minimize the amount of $CO_2$ given off to the atmosphere, thus complying with the Toronto Declaration by contributing to the reduction of $CO_2$ emission, which is regarded as the main cause of climate shifting.

A further reduction of oxygen consumption in the melter gasifier can be achieved if the gas containing a high portion of $CO_2$ is subjected to preheating, because then less $C_{fix}$ from the carbon carriers charged to the melter gasifier will have to be combusted.

A further object of the invention results from the following problem:

Processing of the export gas in accordance with the prior art is generally effected by first of all cleaning it from solid particles in a scrubber, thus cooling it down considerably. Thereupon the $CO_2$ contained in the export gas is removed in accordance with DE-C-40 37 977, as the $CO_2$ impedes the further utilization of the export gas as a reducing gas; the percentage of reductants present in the export gas would be too low. A variety of methods is known for removing the $CO_2$ from the export gas, f.i. the pressure-swing adsorption process or a chemical $CO_2$ scrubbing. In accordance with DE-C-40 37 977 it is thus feasible to largely exploit the energy that is chemically bound in the export gas, yet the $CO_2$-containing offgas incurring in the purification of an export gas represents a problem, as this offgas has to be disposed of in an environmentally compatible manner.

This offgas i.a. contains CO, $H_2$, $CH_4$ and $H_2S$ and for reasons of environmental protection cannot be released into the environment in that state. This is also the reason why it is only conditionally suited for possible further processing. Therefore the sulfur compounds are usually removed from the offgas. Such a desulfurization is up to the present carried out by different methods, such as f.i. by what is called "Stretford scrubbing" or by catalytic oxidation on activated carbon etc. All of these methods are expensive and require additional materials, such as activated carbon or absorbents, which i.a. have to be stored and disposed of separately.

It is internally known to burn off the $CO_2$-containing offgas. This burning-off however requires the provision of combustible supporting gas as an ignition and carburizing gas, since the $CO_2$-containing offgas is of only slight calorific value.

It is a further object of the invention to avoid these disadvantages and difficulties and the invention additionally aims to provide an efficient method of utilizing the export gas incurring in ore reduction, such as the direct reduction effected in producing sponge iron, while at the same time avoiding the difficulties associated therewith in the methods taught by the prior art. In particular it is to be feasible not only to process and dispose of $CO_2$-containing offgas in an environmentally acceptable manner but also to exploit it to the greatest extent possible within the energy scheme of the method and plant. Furthermore, any problems associated with the separation of $H_2S$, which takes place simultaneously with the separation of the $CO_2$, are likewise to be solved in an environmentally acceptable manner.

In accordance with the invention this object is achieved in a method according to claim 1 in that at least a portion of the offgas separated during $CO_2$ removal, which is high in $CO_2$ content, is introduced into the melt-down gasifying zone and there is reacted with carbon under the formation of CO.

In accordance with the invention there not only results a decrease in the high yield of $CO_2$ from the $CO_2$ elimination plant but also an increase in excess CO for further utilization by a consumer, whereby a percentage reduction of the $CO_2$ fraction is effectively obtained. In accordance with the invention it is likewise not necessary to remove as high a percentage of $CO_2$ from the export gas—if it is to be available to a further reduction zone—as with the prior art.

If utilizing petroleum coke, there will possibly result an advantage if the $H_2S$ separated simultaneously with $CO_2$ removal is also conducted into the melter gasifier, whereby the sulfur passes into the liquid phase that has been melted in the melter gasifier. From the latter, the sulfur can however be removed in a simple manner by known methods, and that more easily and by expending less energy than is required for removing the gaseous $H_2S$ from the reducing gas.

According to a preferred embodiment, in accordance with the invention the gas that is high in $CO_2$ content is introduced into the lower end region of the fluidized bed formed in the melt-down gasifying zone, whereby the reaction of the $CO_2$ by carbon will proceed in a particularly effective manner.

Advantageously, the gas that is high in $CO_2$ content is introduced into the melt-down gasifying zone together with the oxygen-containing gas that is conducted to the same. In this case, however, the $CO_2$-containing gas must not contain any combustible portions, otherwise separate ducts will have to be provided for the oxygen-containing gas and the $CO_2$-containing gas, only flowing together in a burner of the melter gasifier.

It is of particular advantage if the gas that is high in $CO_2$ content is introduced into the melt-down gasifying zone together with dusts that are to be fed into the melt-down gasifying zone, wherein suitably the gas that is high in $CO_2$ content is introduced into the melt-down gasifying zone together with dusts that have been separated from the reducing gas forming in the melt-down gasifying zone and are to be recirculated to the melt-down gasifying zone. Reoxidation of iron with $CO_2$, which takes place endothermally, causes a temperature decrease, such that the danger of uncontrolled oxidation is markedly reduced. Herein it is feasible to admix to the nitrogen hitherto used the gas having a high content of $CO_2$ to serve as a conveying gas, which has the advantage that the enrichment of nitrogen in the system can be lowered. The nitrogen can be removed from the system again only with difficulty and results in more energy having to be expended to convey the gas volume thus increased by the nitrogen which must be conveyed along solely by way of ballast.

In order to produce pig iron or steel prematerial having a particularly low sulfur content, suitably the gas that is high in $CO_2$ content and is being fed into the melt-down gasifying zone is subjected to desulfurization prior to its introduction into the melt-down gasifying zone.

The method according to the invention can be applied in a particularly advantageous manner if the export gas being subjected to $CO_2$ removal is formed in at least one first reduction zone and the export gas purified from $CO_2$ is utilized as a reducing gas in at least one further reduction zone, optionally after heating, for reducing further particulate metal oxide-containing material, preferably iron oxide-containing material, and there is reacted. The reason for this is that the gas withdrawn from the export gas of the first reduction zone after $CO_2$ removal and serving as a reducing gas for the further reduction zone has a particularly high percentage of reductants. As already described above, this can be achieved because due to the excess of carbon monoxide (enhanced $CO/CO_2$ ratio) of the reducing gas formed inside the melter gasifier, $CO_2$ removal from the export gas of the first reduction zone does not have to be effected in the same measure as hitherto required. It is feasible f.i. to introduce a portion of the export gas into the further reduction zone directly, without subjecting it to $CO_2$ removal.

Herein, advantageously at least a portion of the flue gas from the heating operation is fed into the melt-down gasifying zone and suitably an offgas separated during $CO_2$ removal, which is high in $CO_2$ content, is utilized for heating, wherein it is further advantageous if a reducing gas that has been reacted in a further reduction zone is utilized for heating and at least a portion of the flue gas thus formed is introduced into the melt-down gasifying zone.

Utilization is particularly good if a portion of the export gas formed in the first reduction zone is subjected at least to partial combustion and the flue gas is fed into the melt-down gasifying zone and if prior to introduction into the melt-down gasifying zone a cooling gas is admixed to the flue gas.

Cooling of the flue gas will be particularly effective in terms of the overall process if the flue gas prior to being fed to the melt-down gasifying zone is cooled in recuperatively heating a gas, preferably an oxygen-containing gas serving for the process. Recuperative heating can also serve for the production of vapor, which can be utilized as an oxidizing agent.

Herein advantageously the export gas formed in the second reduction zone at least partially is likewise subjected to $CO_2$ elimination, preferably after mixture with the export gas from the first reduction zone, and the offgas thus separated, which is high in $CO_2$ content, at least partially is also fed to the melt-down gasifying zone and there is reacted with carbon under the formation of CO.

A plant for carrying out the method, comprising a reduction reactor for iron ore, preferably in lumps and/or pellets, a melter gasifier, a feed duct for a reducing gas connecting the melter gasifier with the reduction reactor, a conveying duct for the reduction product formed in the reduction reactor connecting the reduction reactor with the melter gasifier, an export-gas discharge duct departing from the reduction reactor, feed ducts for oxygen-containing gases and carbon carriers running into the melter gasifier and a tap for pig iron and slag provided at the melter gasifier, characterized in that there runs into the melter gasifier a gas duct conducting a highly $CO_2$-containing gas having a CO content as low as possible.

In accordance with a preferred embodiment, the export-gas discharge duct of the reduction reactor is conducted via a $CO_2$ removal plant and from the $CO_2$ removal plant an offgas duct discharging separated $CO_2$-containing offgas is flow-connected with the melter gasifier.

Suitably the gas duct opens into the melter gasifier in the lower portion of the same, roughly on the level of the lower end region of the fluidized bed formed inside the melter gasifier, wherein, if there is no danger of explosion (at roughly 100% oxidants and 0% reductants), the gas duct advantageously runs into the in den melter gasifier together with a feed duct for oxygen-containing gases.

In accordance with a preferred embodiment the gas duct runs into the melter gasifier together with a feed duct feeding dusts to the melter gasifier, preferably via a burner charging the dusts into the melter gasifier, wherein suitably in the feed duct for the reducing gas connecting the melter gasifier with the reduction reactor a dust separator is provided which by a dust recirculating duct is connected with the melter gasifier, and the gas duct runs into the melter gasifier together with said dust recirculating duct via a dust burner.

To obtain a product having a sulfur content as low as possible a desulfurization means is provided in the gas duct.

A preferred embodiment is characterized in that two reduction reactors are provided which are connected with one another via the export-gas discharge duct of the first reduction reactor and are flow-connected with one another via the $CO_2$ elimination plant, wherein the export gas exiting the $CO_2$ elimination plant is conducted into the second reduction reactor via a heating means.

Herein suitably a conveying duct discharging an export gas of the second reduction reactor opens into a $CO_2$ removal plant, preferably into the $CO_2$ removal plant for the export gas of the second reduction reactor.

In accordance with a preferred embodiment an offgas branch duct runs into the heating means from the $CO_2$ removal plant in order to supply a heating gas and from the heating means a flue-gas discharge duct for discharging the flue gas is flow-connected with the melter gasifier.

Suitably, from the export-gas discharge duct an export-gas branch duct leads to a combustion means and from the latter a flue-gas discharge duct runs into the melter gasifier.

A further preferred embodiment is characterized in that a recuperator, preferably for heating an oxygen-containing gas, f.i. air, is interposed in the flue-gas discharge duct. The hot air can be utilized for ore pre-heating, drying etc.

In the following, the invention is explained in a more detailed manner with reference to several exemplary embodiments schematically represented in the drawings, wherein each of FIGS. 1 to 5 depicts a process variant illustrated in the form of a block diagram.

Figure 1:
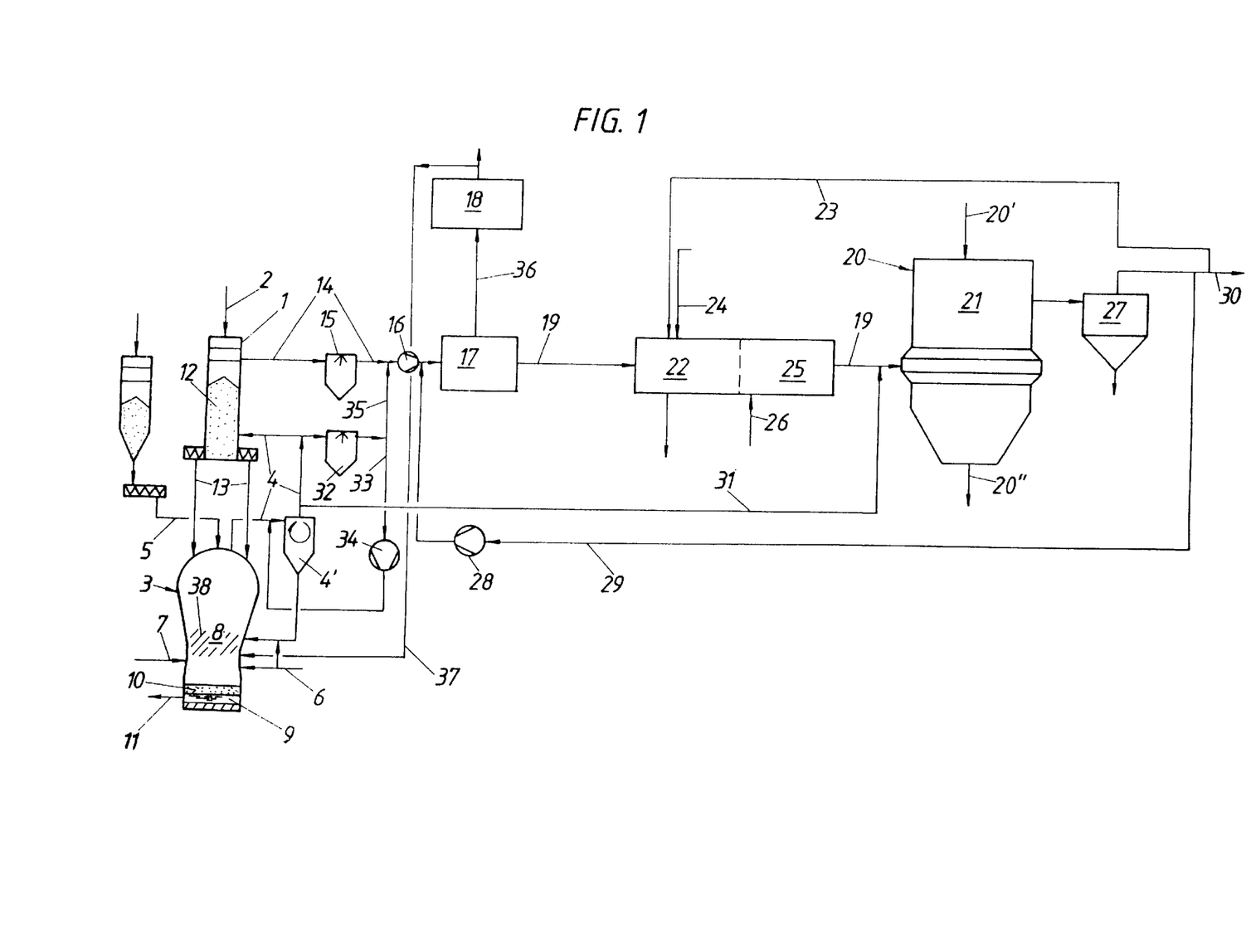
FIG. 1. A block diagram of an embodiment of a process for producing liquid pig iron.

To a first shaft furnace forming a reduction reactor 1, lumpy iron ore and/or pelletized iron ore is top-charged via a conveying means 2 through a sluice system not illustrated in the drawing, optionally along with fluxing materials under the formation of a moving bed. The shaft furnace 1 communicates with a melter gasifier 3, in which from coal and oxygen-containing gas a reducing gas is formed which is fed to the shaft furnace 1 via a feed duct 4, a gas purification means 4' for dry dedustification being optionally provided inside the feed duct 4.

The term "moving bed" is understood to refer to a continuously moving material stream, the movable particles of which come into contact with a flow of reducing gas. Preferably, a material stream is utilized which moves continuously downward by gravity.

Instead of a shaft furnace 1, it is also feasible to provide a reactor incorporating a Venturi-fluidized bed, a circulating fluidized bed, a fluidized bed or a reactor incorporating a traveling grate or a rotary tubular kiln as the reduction reactor.

The melter gasifier 3 has a feed duct 5 for solid carbon carriers, a feed duct 6 for oxygen-containing gases and optionally feed ducts 7 for carbon carriers that are liquid or gaseous at room temperature, such as hydrocarbons, and for calcined fluxes. Inside the melter gasifier 3, molten pig iron 9 and molten slag 10 collect below the meltdown gasifying zone 8 and are run off through a tap 11.

Along with the fluxes calcined in the direct reduction zone 12, the iron ore which has been reduced to sponge iron in a direct reduction zone 12 inside the shaft furnace 1 is introduced through a conveying duct 13 connecting the shaft furnace 1 with the melter gasifier 3, f.i. by means of delivery worms etc. To the upper portion of the shaft furnace 1, an export-gas discharge duct 14 is connected for the export gas which forms from reducing gas in the direct reduction zone 12.

The export gas withdrawn through the export-gas discharge duct 14 is first of all subjected to purification in a scrubber 15, in order to free it from dust particles as completely as possible and to reduce the water vapor content, so that it is subsequently available for further use. Thereupon the export gas by means of a compressor 16 passes into a $CO_2$ removal plant 17 (f.i. a $CO_2$ scrubber or a pressure-swing adsorption plant) in which it is freed from $CO_2$ as completely as possible. The offgas exiting the $CO_2$ removal plant 17 is optionally fed to a desulfurization means 18. Via a reducing-gas feed duct 19, the export gas thus purified from $CO_2$ is supplied to a second reduction reactor which is constructed as a shaft furnace 20 and which, like the first shaft furnace 1 also has a moving bed and is operated according to the counter current principle. In this second shaft furnace 20, iron ore in lumps and/or pellets is directly reduced in a reduction zone 21. The ore feed duct is designated by numeral 20' and the means for bringing out sponge iron by numeral 20".

As the export gas has been considerably cooled by undergoing purification, it is subjected to heating before being introduced into the second reduction shaft furnace 20. Heating is effected in two stages: first of all, the purified export gas in a first stage is subjected to indirect heating, with a heating means 22 employed for this purpose being constructed as a heat exchanger. The heat exchanger 22 (recuperator) is operated by purified export gas which is withdrawn from the second reduction shaft furnace 20 through a duct 23. In addition to this, oxygen-containing gas (oxygen is present in molecular form), such as air, is supplied to the burner of the heat exchanger 22 via a duct 24. Subsequently, the heated export gas is subjected to post-combustion, namely in the post-combustion means 25 where a portion of the purified export gas is burned under oxygen supply 26. By this method, the purified export gas attains the temperature required for reduction in the second reduction shaft furnace 20, which preferably lies in a temperature range of between 600 and 900° C. but which may also be higher, in particular in the case of a coated charging material.

The export gas withdrawn from the second reduction shaft furnace 20 is also subjected to purification and cooling in the export-gas scrubber 27, in order to purify it from dust particles and to reduce the water vapor content, whereupon it can be passed on for further utilization. A portion of the export gas is supplied to the heat exchanger 22 through the duct 23. Another portion of the export gas arising in the second reduction shaft furnace 20 via a compressor 28 is likewise fed to the $CO_2$ removal plant 17, namely via the conveying duct 29 opening into the export-gas discharge duct 14, and after $CO_2$ removal is then available to the second reduction shaft furnace 20 as a recycle-reducing gas. A portion of the export gas of the second reduction shaft furnace 20 is passed onward through the export gas duct 30 for other uses.

Via a branch duct 31 departing from the feed duct 4 a portion of the reducing gas formed inside the melter gasifier 3, upon passing through a dust removal cyclone 4' unscrubbed, i.e. without flowing through a scrubber, is in the hot state admixed to the reducing-gas mixture formed of recycle reducing gas and export gas that has been purified from $CO_2$, via the branch duct 31, namely after such reducing gas mixture has passed the heat exchanger 22 and the post-combustion means 25. In this way, the sensible heat of the reducing gas formed inside the melter gasifier 3 is supplied to the direct reduction process taking place in the further reduction shaft furnace 20 and thus is effectively utilized. Hereby savings can be achieved not only in respect of the $CO_2$ removal plant 17 and in the dimensioning of the heat exchanger 22 and the post-combustion means 25, but there also result energy savings during the operation of the same.

It is true that the hot, branched-off reducing gas after passing through the dust removal cyclone 4' still exhibits a residual dust content, but this can be coped with by the system without causing trouble, as the dust content is considerably diluted by mixing such hot branched-off reducing gas with the recycle reducing gas and the export gas which has been subjected to purification from $CO_2$. Negative effects on the direct reduction process taking place in the second reduction shaft furnace 20 are therefore not to be expected.

A portion of the reducing gas is recirculated back into the feed duct 4 via a scrubber 32 and via a duct 33 with compressor 34, in order to condition the reducing gas which exits the melter gasifier 3 in a very hot state before it enters the gas purifying means 4', particularly in order to cool it down to a temperature range favorable to the direct reduction process in the shaft furnace 1. Through a compensating duct 35 it is feasible to optionally admix reducing gas to the export gas leaving the shaft furnace 1 with a view to controlling the system pressure.

The fact that a considerable volume flow of the reducing gas supplied to the second reduction shaft furnace 20 is not supplied to the $CO_2$ removal plant 17 but viewed in the direction of flow of the reducing gas is only subsequently mixed with the portion of the reducing gas leaving the $CO_2$ removal plant 17 enables a substantial dimensional reduction of the $CO_2$ removal plant 17.

In accordance with the embodiment illustrated in FIG. 1, $CO_2$-containing offgas that has been separated in the $CO_2$ removal plant 17 through an offgas duct 36 is supplied to the desulfurization means 18 and is discharged after desulfurization. Desulfurization of the offgas exiting the $CO_2$ removal plant 17 can be carried out by far more efficiently than a desulfurization effected at a different point of the plant because the offgas exiting the $CO_2$ removal plant 17 has a sulfur content which is three times that of the export gas and, i.a., is determined by operating characteristics of the further direct reduction process.

From the offgas duct 36, a portion of the offgas having a high $CO_2$ content is fed into the melter gasifier 3 through a branch duct 37, namely at a position above the lower end region of the fluidized bed 38 formed inside the melter gasifier 3.

In this fluidized bed 38, the $CO_2$ of the offgas reacts with the carbon present within the melter gasifier 3 according to the equation $CO_2 + C \rightarrow 2\,CO$. The resulting carbon monoxide ascends through the fluidized bed 38 and increases the reducing gas stream as well as the reductant fraction of the same. Due to the endothermal reaction of the carbon dioxide gas to carbon monoxide, overheating in the melter gasifier 3, which may above all occur if utilizing coals having a high portion of $C_{fix}$, are reliably avoided.

Figure 2:
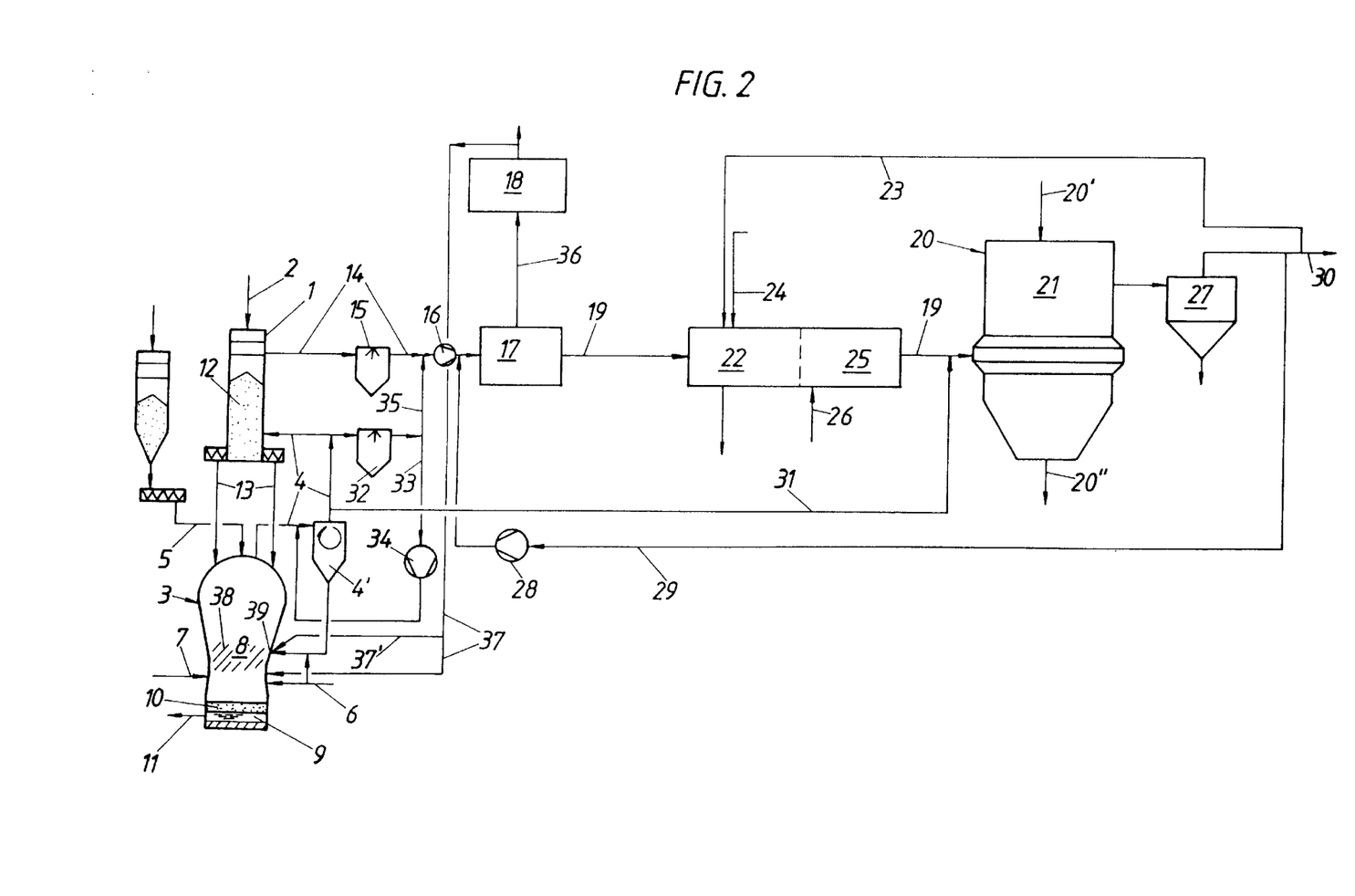
FIG. 2. A block diagram of an embodiment of a process for producing liquid pig iron.

In accordance with the particular embodiment represented in FIG. 2, a portion of the offgas having a high $CO_2$ content via a duct 37' branching off from the branch duct 37 is conducted to a dust burner 39, via which the dust of the reducing gas separated in the dust separator 4' is again supplied to the melter gasifier 3 and is charged into the melter gasifier 3 together with the dust fed in through the dust burner 39. Herein, the offgas having a high portion of $CO_2$ can replace part of the nitrogen that usually conveys the dust to the dust burner 39, whereby the above-mentioned advantages of a reduced nitrogen ballast in the reducing gas can be achieved.

Figure 3:
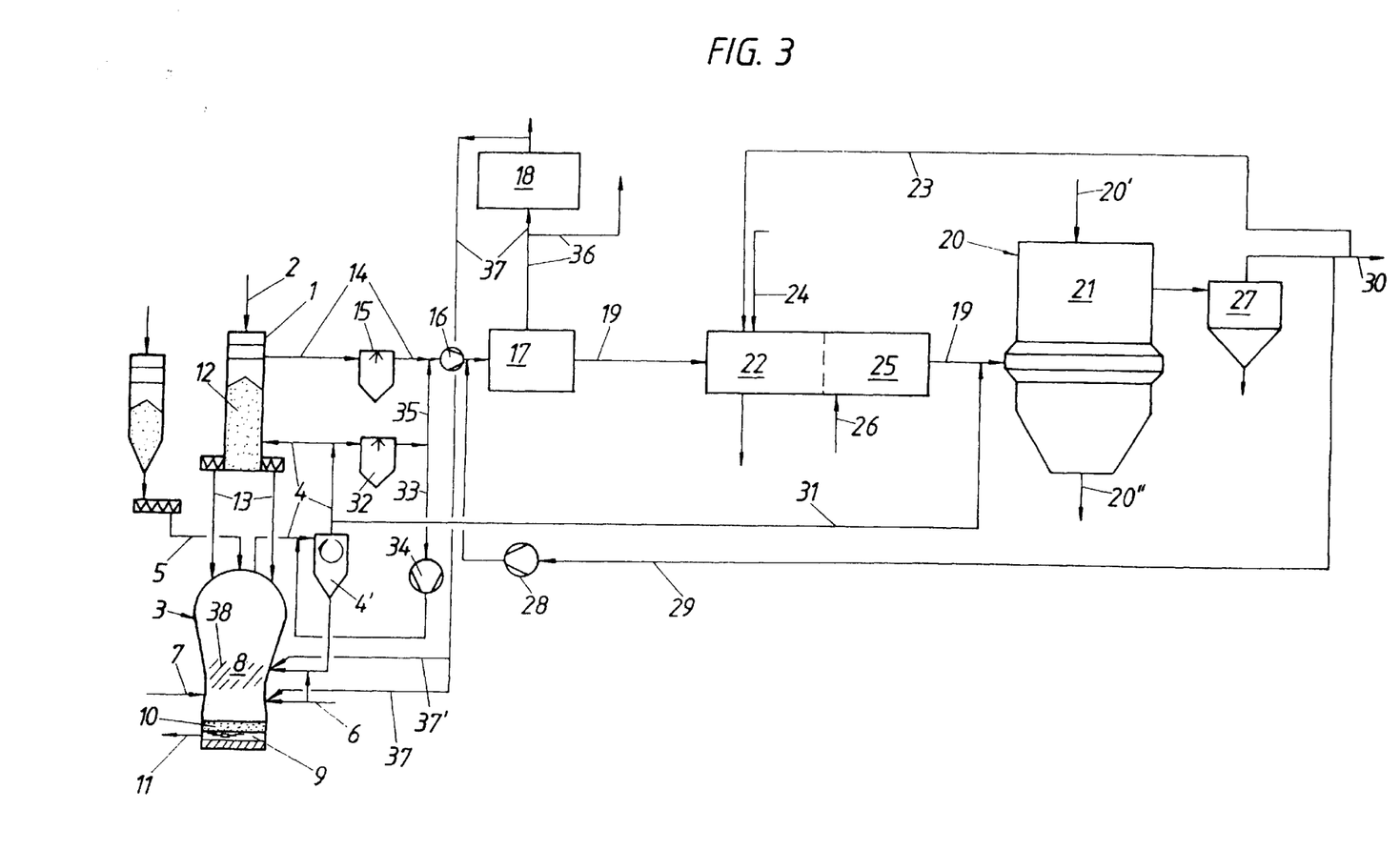
FIG. 3. A block diagram of an embodiment of a process for producing liquid pig iron.

In accordance with FIG. 3, only the $CO_2$-containing offgas from the $CO_2$ removal plant 17 which has been recycled to the melter gasifier 3 is subjected to desulfurization and the branch duct 37 opens into the melter gasifier 3 together with the feed duct 6 that introduces the oxygen into the melter gasifier 3.

In the following, the method in accordance with the invention is set forth in greater detail by means of an example:

In the production of liquid pig iron in the melter gasifier 3 from iron ore pellets there arise roughly 100 t/h pig iron as well as roughly 155,000 Nm³/h export gas. Such export gas is fed to the second reduction shaft furnace 20 for the further reduction of iron ore after having been freed from $CO_2$ in a $CO_2$ removal plant 17. The export gas exiting the reduction shaft furnace 1 has a $CO_2$ content of approximately 37 Vol. %. Consequently, an amount of 57,350 Nm³/h $CO_2$ arises in the $CO_2$ removal plant 17.

Out of this amount of $CO_2$, roughly 10,500 Nm³/h $CO_2$ are recycled to the melter gasifier 3 in which 100% anthracite is employed as the carbon carrier. By this method on the one hand the reaction temperature is reduced to the dimension required for reasons of process engineering by the endothermal reaction of the $CO_2$ with the carbon present in the melter gasifier 3 and on the other hand roughly 21,000 Nm³/h CO are formed due to the doubling of the $CO_2$ mass flux caused by the chemical reaction of the $CO_2$ with C. The additional amount of CO is then available to the further reduction shaft furnace 20. Approximately 18% of the offgas having a high $CO_2$ content which exits the $CO_2$ removal plant 17 can therefore be re-utilized in a profitable manner.

In the following, the thermal balance of the method according to the invention is explained in a more detailed manner, wherein, however, only the amounts of energy that exceed the amounts of heat required in the melting reduction taking place in the melter gasifier are considered in greater detail. Our purpose here is to illustrate the effects of a single Nm³ $CO_2$ in pure form, wherein for easier computability it is assumed by way of simplification that the $CO_2$, C and $O_2$ be available at 25° C. and the reaction product CO have a temperature of 1060° C. Herein, the enthalpy of reaction is $\Delta H=+238$ kJ/mol for the reaction $CO_2+C \rightarrow 2$ CO. For the reaction $O_2+2C \rightarrow 2$ CO, the enthalpy of reaction is $\Delta H=-156$ kJ/mol. Hence it follows that 1.53 Nm³ $O_2$ have to be charged per Nm³ $CO_2$, wherein roughly 5 Nm³ CO are formed from 1 Nm³ $CO_2$, namely under the consumption of 2.17 kg C.

Figure 4:
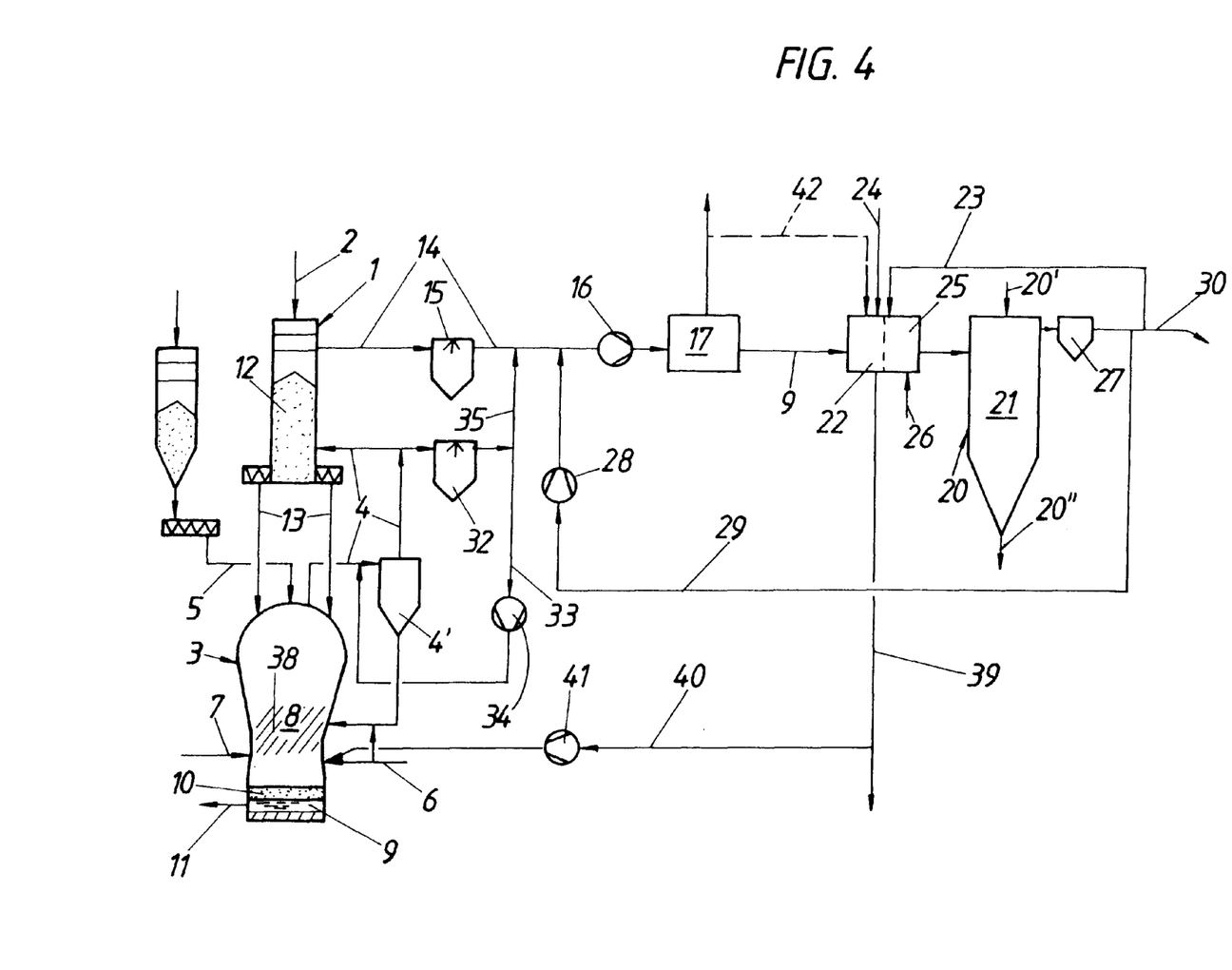
FIG. 4. A block diagram of an embodiment of a process for producing liquid pig iron.

In accordance with the embodiment depicted in FIG. 4, flue gas streaming out of the heating means 22 via the flue-gas discharge duct 39 at least in part is fed into the melter gasifier 3 via branch duct 40 in which a compressor 41 is provided. Such flue gas likewise has a very high content of $CO_2$ and a very low content of CO. To heat the reducing gas conducted to the further reduction reactor 20 it is feasible in doing so to additionally make use of offgas from the $CO_2$ removal plant, with the offgas being conducted to the heating means 22 via an offgas branch duct 42 illustrated in broken lines in FIG. 4.

Figure 5:
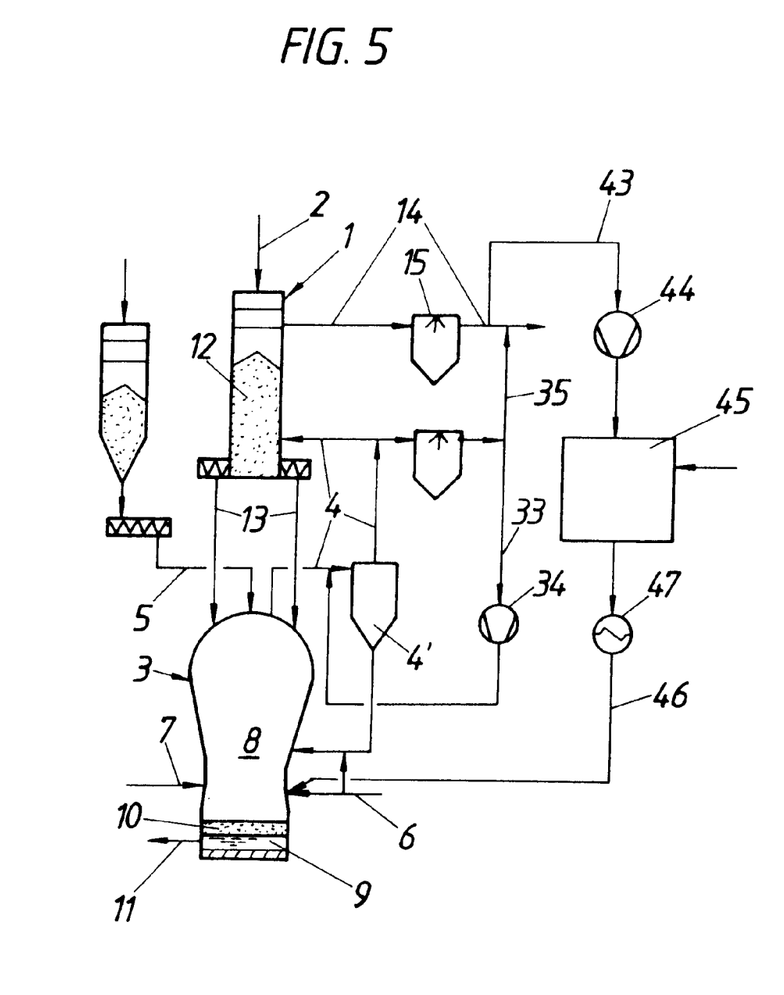
FIG. 5. A block diagram of an embodiment of a process for producing liquid pig iron.

In accordance with the embodiment represented in FIG. 5, a portion of the export gas discharged from the reduction reactor 1, via an export-gas branch duct 43 and a compressor 44 is subjected to combustion in a combustion means 45 and the flue gas formed in the process is at least in part fed into the melter gasifier 3 via a flue-gas discharge duct 46. In the flue-gas discharge duct there is advantageously provided a recuperator 47, fi. for preheating oxygen that is required for the coal gasification process. This is necessary in particular if combustion of the export gas is effected completely and without subsequent mixing with a cooling gas, as a complete combustion will result in a very high combustion temperature. The combustion can, however, also be effected after mixing the export gas with a different gas or even in the form of a partial combustion.

The invention is not limited to the exemplary embodiments described in detail in the description but can be modified in various respects. F.i. it is also feasible to provide two or several first reduction shaft furnaces 1, wherein it is feasible to pool their export gases and put them at disposal of at least one further reduction shaft furnace 20 after $CO_2$ removal. It is further feasible to conduct the export gas recycled from the reduction shaft furnace 20 via a separate plant for eliminating the $CO_2$, which operates independently of the $CO_2$ removal plant for the export gas from the reduction shaft furnace 1, wherein this $CO_2$ elimination plant can be constructed as a reformer.

What is claimed is:

1. A method for producing liquid pig iron or liquid steel pre-products from charging substances, comprising the steps of:

reducing iron ore and optionally fluxes to sponge iron in a reduction zone (12), said reduction zone (12) is formed within a reduction reactor (1);

melting said sponge iron in a melt-down gasifying zone (8) formed within a melter gasifier (3) under a supply of carbon carriers and oxygen-containing gas, and a CO- and $H_2$-containing reducing gas is produced;

introducing the produced CO- and $H_2$-containing reducing gas into the reduction zone (12); and withdrawing an export gas containing $CO_2$ from the reduction zone (12), said export gas containing $CO_2$ is conducted to a consumer (20), wherein the export gas containing $CO_2$ is subjected to $CO_2$ removal in the consumer (20) and at least a portion of an offgas from the consumer (20), having a high $CO_2$ content, separated during the $CO_2$ removal is introduced into the melt-down gasifying zone (8) so that it can react with the carbon carriers to form carbon monoxide.

2. The method according to claim 1, wherein the offgas is introduced into lower end region of the moving bed (38) formed in the melt-down gasifying zone (8).

3. The method according to claim 1, wherein the offgas is introduced with the oxygen-containing gas into lower end region of a moving bed (38) formed in the melt-down gasifying zone (8).

4. The method according to claim 1, wherein the offgas is introduced together with dusts into the melt-down gasifying zone (8).

5. The method according to claim 4, wherein said dusts is obtained from the reducing gas forming in the melt-down gasifying zone (8) and recirculated back into the melt-down gasifying zone (8).

6. The method according to claim 2, the offgas is subjected to desulfurization prior to its introduction into the meltdown gasifying zone (8).

7. The method according to claim 1, the export gas subjected to $CO_2$ removal is formed in at least one reduction zone (12) and the export gas purified from $CO_2$ is utilized as a reducing gas in at least one further reduction zone (21), optionally after heating, to reduce particulate metal oxide-containing material.

8. The method according to claim 7, wherein a portion of flue gas from heating operation (22) is fed into the melt-down gasifying zone (8).

9. The method according to claim 7, wherein the offgas is utilized for heating in heating operation (22).

10. The method according to claim 9, wherein the reducing gas reacted in reduction zone (21) is utilized for heating operation (22) and at least a portion of a flue gas formed in heating operation (22) is introduced into the melt-down gasifying zone (8).

11. A method for producing liquid pig iron or liquid steel pre-products from charging substances, comprising the steps of:

reducing said iron ore and optionally fluxes to sponge iron in a reduction zone (12), said reduction zone (12) is formed within a reduction reactor (1);

melting said sponge iron in a melt-down gasifying zone (8) formed within a melter gasifier (3) under a supply of carbon carriers and oxygen-containing gas, and a CO- and $H_2$-containing reducing gas is produced;

introducing the produced CO- and $H_2$-containing reducing gas into the reduction zone (12); and withdrawing an export gas containing $CO_2$ from the reduction zone (12), said export gas containing $CO_2$ is conducted to a consumer (20), wherein a portion of the export gas containing $CO_2$ formed in reduction zone (12) is subjected at least to partial combustion and a flue gas from heating operation (22) is fed into the melt-down gasifying zone (8) so that it can react with the carbon carriers to form carbon monoxide.

12. The method according to claim 11, wherein the flue gas prior to being fed into the melt-down gasifying zone (8), is admixed with a cooling gas.

13. The method according to claim 11, wherein the flue gas prior to being fed into the melt-down gasifying zone (8) is cooled.

14. The method according to claim 7, wherein the export gas containing $CO_2$ formed in reduction zone (21) at least partially is subjected to $CO_2$ elimination, after mixture with the export gas from the reduction zone (12).

15. The method for producing liquid pig iron or liquid steel pre-products from charging substances according to claim 1, wherein the iron ore is selected from the group consisting of lumps and pellets.

* * * * *